US008135621B2

(12) United States Patent
Vishik et al.

(10) Patent No.: US 8,135,621 B2
(45) Date of Patent: Mar. 13, 2012

(54) SYSTEM AND METHOD FOR SUPPORTING ANONYMOUS TRANSACTIONS

(75) Inventors: Claire S. Vishik, Austin, TX (US); Suresh K. Damodaran-Kamal, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1562 days.

(21) Appl. No.: 10/133,095

(22) Filed: Apr. 26, 2002

(65) Prior Publication Data

US 2003/0204445 A1 Oct. 30, 2003

(51) Int. Cl.
*G06Q 30/00* (2006.01)

(52) U.S. Cl. ............ 705/26; 705/1; 705/10; 705/14; 705/24; 705/27; 705/30; 705/37; 705/38; 705/39; 705/40; 705/41; 705/43; 709/201; 709/203; 709/217; 709/219; 709/223; 709/224; 709/228; 709/229

(58) Field of Classification Search .............. 705/26, 705/27, 31, 19, 64, 74, 77, 78; 709/217
See application file for complete search history.

(56) References Cited

U.S. PATENT DOCUMENTS

| | | | | |
|---|---|---|---|---|
| 5,794,207 | A | | 8/1998 | Walker et al. ............ 705/23 |
| 6,236,972 | B1 | | 5/2001 | Shkedy ............ 705/1 |
| 6,748,366 | B1 | * | 6/2004 | Hurwitz et al. ............ 705/53 |
| 2002/0013739 | A1 | * | 1/2002 | O'Donnell et al. ............ 705/26 |
| 2002/0019764 | A1 | * | 2/2002 | Mascarenhas ............ 705/10 |
| 2002/0103766 | A1 | * | 8/2002 | Chi ............ 705/74 |
| 2002/0116337 | A1 | * | 8/2002 | Peled et al. ............ 705/51 |
| 2002/0138448 | A1 | * | 9/2002 | Younouzov ............ 705/74 |
| 2002/0194122 | A1 | * | 12/2002 | Knox et al. ............ 705/39 |
| 2002/0198966 | A1 | * | 12/2002 | Jenkins ............ 709/219 |
| 2003/0046202 | A1 | * | 3/2003 | Knapp ............ 705/35 |
| 2004/0083184 | A1 | * | 4/2004 | Tsuei et al. ............ 705/74 |
| 2004/0122767 | A1 | * | 6/2004 | Sanchez ............ 705/40 |
| 2004/0254893 | A1 | * | 12/2004 | Tsuei et al. ............ 705/74 |
| 2004/0254894 | A1 | * | 12/2004 | Tsuei et al. ............ 705/74 |
| 2004/0260653 | A1 | * | 12/2004 | Tsuei et al. ............ 705/54 |

FOREIGN PATENT DOCUMENTS

WO    WO 01/90845    11/2001

OTHER PUBLICATIONS

Miyazak, Anthony D.; Fernandez, Ana. Consumer Perceptions of Privacy and Security Risks for Online Shopping.(Statistical Data Included). Journal of Consumer Affairs , vol. 35 , No. 1 , p. 27 , Summer 2001.*

* cited by examiner

*Primary Examiner* — F. Zeender
*Assistant Examiner* — Fawaad Haider
(74) *Attorney, Agent, or Firm* — Jackson Walker L.L.P.

(57) ABSTRACT

A method for supporting anonymous transactions includes storing a first profile comprising first information associated with a first client. The first information includes identifying data and non-identifying data associated with the first client. The method also includes storing a second profile including second information associated with the first client. The second information includes at least a portion of the non-identifying data from the first profile. The method further includes receiving a request from the first client to engage in an anonymous transaction. The anonymous transaction is associated with a product. In addition, the method includes communicating an order for the product to one of the clients and facilitating completion of the order using the first profile. The second client can gain at least partial access to the second profile but not to the first profile associated with the first client.

8 Claims, 3 Drawing Sheets

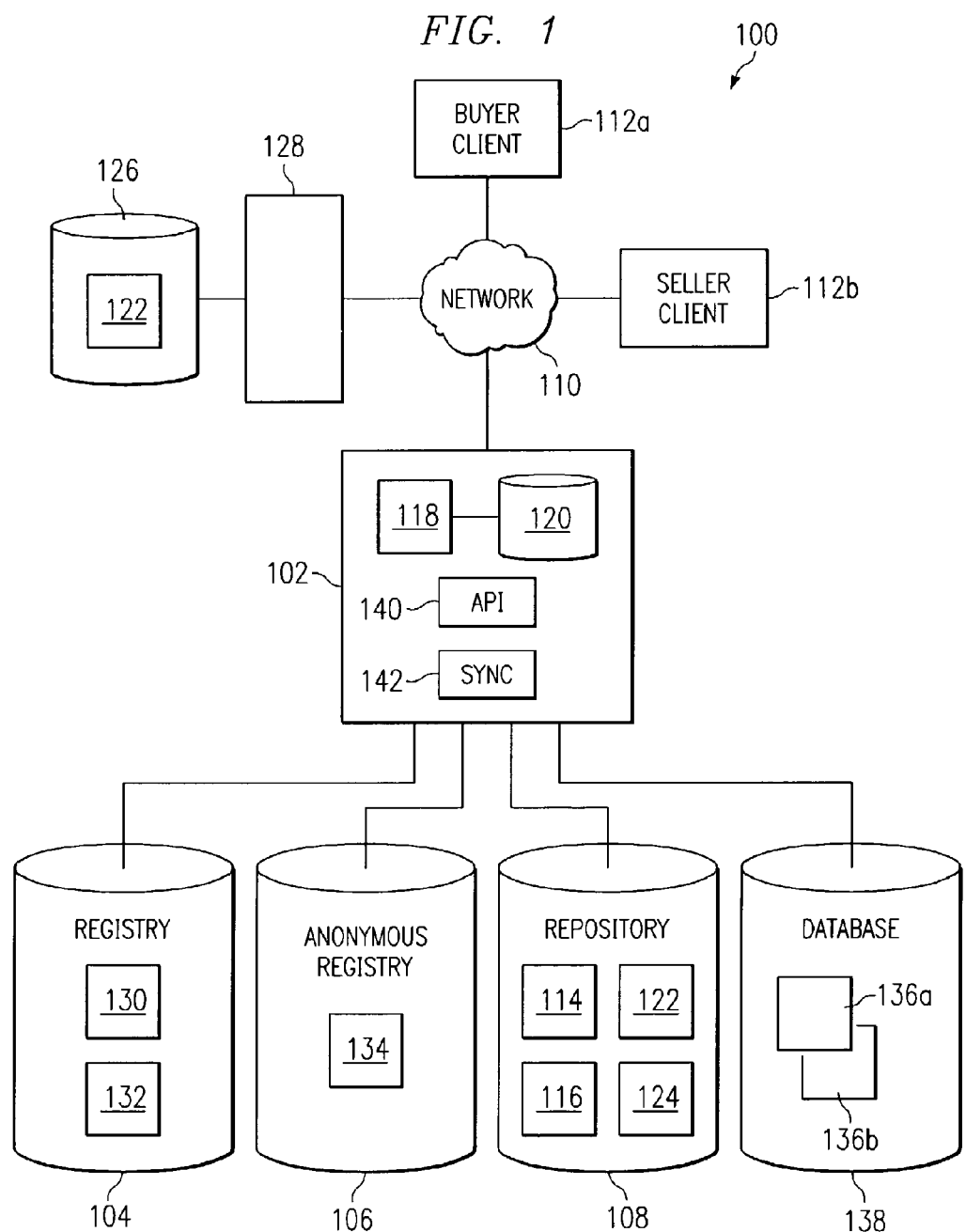

FIG. 2A

| USER ID 252 | NAME 254 | ADDRESS 256 | INDUSTRY AFFILIATION 258 | LOCATION 260 | PAYMENT INFORMATION 262 | DELIVERY OPTIONS 264 | REQUEST FORMATS 266 | COMMUNICATIONS PROTOCOLS 268 |
|---|---|---|---|---|---|---|---|---|
| UID1 | ABC | A1 | SOFTWARE | TX | P1 | UPS, FedEx | F1, F2, F3 | P1, P2, P4 |
| UID2 | MNO | A2 | HARDWARE | NY, CA | P2 | FedEx | F1, F2 | P1, P2, P3 |
| UID3 | XYZ | A3 | AUDIO/VIDEO | FL | P3 | AIRBORNE, UPS | F2, F4 | P2, P3 |
| ... | ... | ... | ... | ... | ... | ... | ... | ... |

| USER ID 252 | INDUSTRY AFFILIATION 258 | DELIVERY OPTIONS 264 | REQUEST FORMATS 266 | COMMUNICATIONS PROTOCOLS 268 | LINK TO FULL PROFILE 272 |
|---|---|---|---|---|---|
| UID1 | SOFTWARE | UPS, FedEx | F1, F2, F3 | P1, P2 | PTR1 |
| UID3 | AUDIO/VIDEO | AIRBORNE, UPS | F2 | P2, P3 | PTR2 |
| ... | ... | ... | ... | ... | ... |

← 216

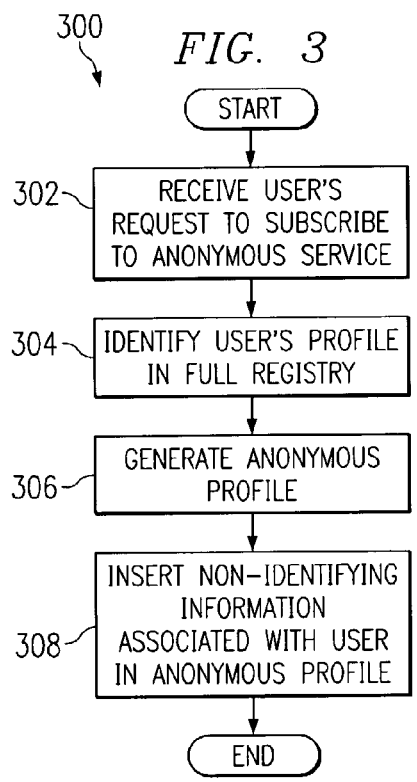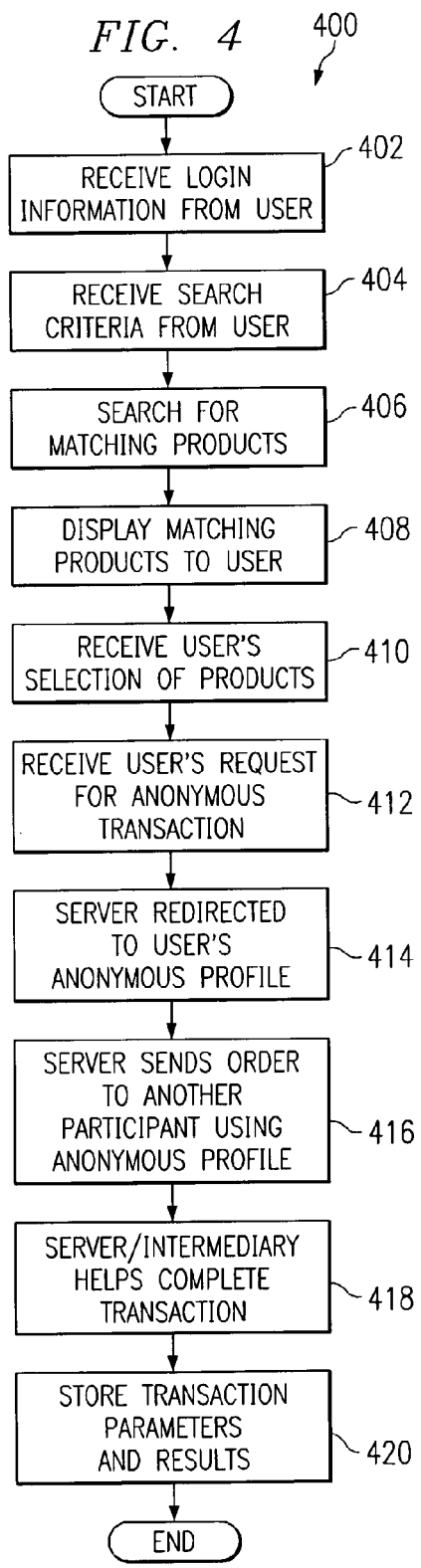

SYSTEM AND METHOD FOR SUPPORTING ANONYMOUS TRANSACTIONS

TECHNICAL FIELD

This invention relates generally to the field of computing systems, and more particularly to a system and a method for supporting anonymous transactions.

BACKGROUND

Purchasing and other transactions routinely occur over the Internet in electronic marketplaces and other business systems. These electronic systems typically allow buyers to locate suitable sellers and sellers to locate suitable buyers. However, it is often difficult to engage in transactions in the electronic systems while maintaining the anonymity of one or more of the participants. For example, when a transaction involves the supply of goods or services to a purchaser, it is often difficult to hide the identity of the purchaser from the supplier of the goods or services. As particular examples, it may be difficult to balance the need for anonymity against the need to guarantee or carry out payment for the goods or services and the need to assure timely fulfillment of an order.

BRIEF DESCRIPTION OF THE DRAWINGS

To provide a more complete understanding of the present invention and features and advantages thereof, reference is made to the following description in conjunction with the accompanying drawings, in which:

FIG. 1 is a block diagram illustrating an example system for supporting anonymous transactions;

FIGS. 2A and 2B are block diagrams illustrating example user profiles in a system for supporting anonymous transactions;

FIG. 3 is a flow diagram illustrating an example method for generating an anonymous profile in a system for supporting anonymous transactions; and FIG. 4 is a flow diagram illustrating an example method for supporting an anonymous transaction.

DETAILED DESCRIPTION OF EXAMPLE EMBODIMENTS

FIG. 1 is a block diagram illustrating an example system 100 for supporting anonymous transactions. In the illustrated embodiment, system 100 includes a transaction server 102, a full registry 104, an anonymous registry 106, a repository 108, a network 110, and one or more clients 112. Other embodiments of system 100 may be used without departing from the scope of this disclosure.

In one aspect of operation, server 102 supports anonymous transactions in one or more electronic marketplaces or other business systems. In this document, the term "marketplace" may refer to any environment that supports or otherwise facilitates the occurrence of one or more transactions. This may include electronic marketplaces, electronic business systems, and/or any other suitable electronic or non-electronic systems. Also, in this document, the term "product" may refer collectively to products, services, and/or other tangible or intangible items. In addition, the phrase "anonymous transaction" may refer to a transaction in which the identity of at least one participant involved in the transaction is not known to at least one other participant involved in the transaction.

In one embodiment, server 102 creates and maintains one or more full registries 104 and one or more anonymous registries 106. In a particular embodiment, a full registry 104 may reference or contain a participant profile 114 that includes identifying data and non-identifying data about a participant, while an anonymous registry 106 may reference or contain an anonymous profile 116 that includes non-identifying data about the participant. In this document, the phrase "identifying data" may refer to information that could be used to identifying a participant and/or a unique characteristic of the participant. Also, in this document, the phrase "non-identifying data" may refer to information that does not identify a participant or a unique characteristic of the participant. During an anonymous transaction, server 102 may use the non-identifying data in the anonymous profile 116, and server 102 may link or redirect the transaction to the full participant profile 114 associated with the anonymous participant. This may help to hide the identity of the anonymous participant from another participant in a transaction.

Server 102 is coupled to full registry 104, anonymous registry 106, repository 108, and network 110. In this document, the term "couple" may refer to any direct or indirect communication between two or more components, whether or not those components are in physical contact with one another. Also, the term "communication" may refer to communication between physically separate components or between components within a single physical unit. Server 102 is operable to support one or more anonymous transactions in system 100. For example, server 102 could receive information, such as from a client 112, identifying a participant that wishes to engage in an anonymous transaction. Server 102 could also facilitate communication between the anonymous participant and another participant in system 100, such as a participant using another client 112. Server 102 could further help to verify that payment has been made and to confirm that a transaction has been completed. Server 102 may include any hardware, software, firmware, or combination thereof operable to support one or more anonymous transactions in system 100.

In one embodiment, server 102 may include one or more processors 118 and one or more memories 120. Processor 118 executes instructions and manipulates data to perform the operations of server 102. Although FIG. 1 illustrates a single processor 118 in server 102, multiple processors 118 may be used according to particular needs, and reference to processor 118 is meant to include multiple processors 118 where applicable. Memory 120 stores and facilitates retrieval of information used by processor 118 to perform the functions of server 102. Memory 120 may, for example, store instructions to be performed by processor 118 and data used by processor 118. Memory 120 may include any hardware, software, firmware, or combination thereof suitable to store and facilitate retrieval of information. Although FIG. 1 illustrates memory 120 as residing within server 102, memory 120 may reside at any location or locations accessible by processor 118. Also, this illustrates one example of how the functionality of server 102 may be implemented. In other embodiments, the functionality of server 102 could be implemented using logic stored in any suitable device or devices, such as a random access memory, a read-only memory, an application-specific integrated circuit (ASIC), or a field programmable gate array (FPGA).

Clients 112 are coupled to network 110. A client 112 may represent any suitable computing or communicating device through which a participant may access a marketplace and enter into a transaction. Client 112 could, for example, represent a desktop computer, a laptop computer, a server computer, a wireless device, a personal digital assistant, and/or any other suitable device. In a particular embodiment, client 112 could represent an Enterprise Resource Planning (ERP) system used by a seller to accept purchase orders for products. In the illustrated embodiment, clients 112 have been divided into buyer clients 112a associated with participants wishing to purchase or otherwise obtain a product and seller clients 112b associated with participants wishing to sell or otherwise supply a product. This is for ease of illustration and explanation only. A single client 112 could, for example, represent one or more participants wishing to both obtain and supply one or more products.

Network 110 is coupled to server 102 and clients 112. Network 110 facilitates communication between components of system 100. Network 110 may, for example, communicate Internet Protocol (IP) packets, frame relay frames, Asynchronous Transfer Mode (ATM) cells, and/or other suitable information between network addresses. Network 110 may include one or more local area networks (LANs), metropolitan area networks (MANs), wide area networks (WANs), all or a portion of the global computer network known as the Internet, and/or any other communications system or systems at one or more locations.

In the illustrated embodiment, server 102 supports transactions in system 100 using registry 104, anonymous registry 106, and repository 108. In this example embodiment, repository 108 is coupled to server 102. In one embodiment, repository 108 stores information used to allow participants to engage in transactions in one or more marketplaces. For example, repository 108 may store marketplace information 122. Marketplace information 122 could identify the products sold or otherwise made available in a marketplace, a description of the products, and the prices of the products. Marketplace information 122 could include any other and/or additional information about a marketplace without departing from the scope of this disclosure.

Repository 108 could also store one or more participant profiles 114. Participant profile 114 could include one or more fields identifying various information associated with a participant in system 100. As particular examples, participant profile 114 could include information identifying the name, address, and telephone number of a participant. Participant profile 114 could also include, among other information, information identifying the type of industry in which the participant operates, payment information associated with the participant, and the communications protocols used by the participant when communicating over network 110. Participant profile 114 could include any other and/or additional information about a participant, such as the business processes used by the participant and/or a rating given to the participant by the operator of server 102 or other participants, without departing from the scope of this disclosure. One example of at least a portion of a participant profile is shown in FIG. 2A, which is described below.

In one embodiment, participant profile 114 includes both identifying data and non-identifying data. As a particular example, the name, address, telephone number, and payment information associated with a participant might identify the actual participant and/or a unique characteristic associated with the participant, so this information could represent identifying data. As another particular example, the type of industry in which the participant operates and the communications protocols used by the participant could represent non-identifying data. Additionally, non-identifying data can be derived from identifying data based on business rules 136 embedded in system 100 and/or customized by the participants. Depending on the circumstances, the industry affiliation of a participant might not specifically identify the participant. Similarly, the communications protocols used by the participant might not specifically identify the participant if the protocols are commonly used.

Repository 108 could further store one or more anonymous profiles 116. Anonymous profile 116 may include one or more fields containing non-identifying data about a participant. The information contained in anonymous profile 116 could vary depending on particular circumstances. For example, anonymous profile 116 could lack the name, address, telephone number, and payment information associated with a participant because this information might identify the participant. In one embodiment, anonymous profile 116 contains a subset of the information from an associated participant profile 114.

In addition, repository 108 could store historical information 124. Historical information 124 may include information about prior transactions involving participants in system 100. For example, historical information 124 could include information identifying the previous products ordered, the quantity ordered, the purchase price, the shipping options selected, and the method and time of payment in prior transactions. In a particular embodiment, each participant in system 100 may have an associated transaction log storing historical information 124 for that participant, and the logs may or may not be fully available for the participants to access. Also, historical information 124 could include or otherwise be associated with a ranking of a participant. For example, the operator of server 102 (the "intermediary") could rank a participant based on the participant's behavior during previous transactions, such as whether the participant made timely payments and/or timely deliveries during the previous transactions. In some cases, the ranking information can be included in an anonymous profile 116 and made available to another participant during an anonymous transaction. This may allow, for example, the other participant to learn that the anonymous participant has a high ranking, which may encourage the other participant to enter into the anonymous transaction. Additionally, historical information 124 could be associated with a set of business rules 136. In one embodiment, business rules 136 may generate contract terms and/or determine the availability and amount of any discounts that could be available to a participant using the prior transactions of the participant. Historical information 124 could include any other and/or additional information associated with prior transactions.

Repository 108 may reside on any hardware, software, firmware, or combination thereof operable to store and facilitate retrieval of information. Repository 108 may also use any of a variety of data structures, arrangements, compilations, and/or programs suitable to store and facilitate retrieval of information. Repository 108 could, for example, include a dynamic random access memory (DRAM), a static random access memory (SRAM), or any other suitable volatile or nonvolatile storage and retrieval device or combination of devices. As a particular example, repository 108 could store objects containing the marketplace information 122, full participant profiles 114, anonymous profiles 116, and/or other information. While FIG. 1 illustrates repository 108 coupled to server 102, repository 108 may reside in any location or locations accessible by server 102. Also, repository 108 could be omitted from system 100, and the information contained in repository 108 could be stored in registry 104 or any other suitable location or locations. For example, marketplace information 122 could reside in an external system, such as in a database 126 of a web server 128 or in a client 112. Repository 108 could also be represented by a set of distributed elements.

Registry 104 is coupled to server 102. In one embodiment, registry 104 acts as an index for and interface to repository 108. For example, registry 104 could store at least one marketplace index 130. Market index 130 may identify the location of the marketplace information 122 associated with a marketplace. Marketplace index 130 could also include application program interfaces that link to product catalogs, ERP system, and inventory systems. Marketplace index 130 could further include pointers to web services for product catalogs, shipping applications, and other information related to a marketplace. A participant, such as a user using a client 112, may attempt to access information about the marketplace. Server 102 could access registry 104 and, using the marketplace index 130, identify the location of the marketplace information 122 associated with the marketplace. Server 102 could then access the marketplace information 122, display some or all of the marketplace information 122 to the participant, and allow the participant to decide whether or not to enter into a transaction involving the marketplace. Registry 104 could also store at least one participant profile index 132. Participant profile index 132 may, for example, identify the location of objects and data structures in a participant profile 114 in repository 108. In one embodiment, the marketplace index 130 and the participant profile index 132 represent metadata associated with the marketplace information 122 and the participant profile 114, respectively. Registry 104 could store any other and/or additional information without departing from the scope of this disclosure. Registry 104 could include any hardware, software, firmware, or combination thereof operable to store and facilitate retrieval of information using any of a variety of data structures, arrangements, compilations, and/or programs.

Anonymous registry 106 is coupled to server 102. Anonymous registry 106 stores information used to facilitate anonymous transactions in system 100. For example, anonymous registry 106 may store at least one anonymous profile index 134. Anonymous profile index 134 may, for example, identify the location of an anonymous profile 116 in repository 108. In one embodiment, anonymous profile index 134 represents metadata associated with the anonymous profiles 114. Anonymous registry 106 could store any other and/or additional information without departing from the scope of this disclosure. Anonymous registry 106 could include any hardware, software, firmware, or combination thereof operable to store and facilitate retrieval of information using any, of a variety of data structures, arrangements, and/or compilations.

The information stored in registry 104, anonymous registry 106, and repository 108 could follow any suitable format and/or standard. In particular embodiments, the information stored in registry 104, anonymous registry 106, and/or repository 108 may follow the Universal Description, Discovery and Integration (UDDI) standard or the Enterprise Business eXtensible Markup Language (ebXML) standard. Also, the division of information between registry 104, anonymous registry 106, and repository 108 is for illustration only. Information illustrated as residing in one location in system 100 could reside in another location or locations in system 100. Further, while FIG. 1 illustrates registry 104, anonymous registry 106, and repository 108 as being separate entities, the information stored in registry 104, anonymous registry 106, and/or repository 108 could reside in a common physical medium without departing from the scope of this disclosure.

In one embodiment, server 102 may use one or more business rules 136 to generate anonymous profiles 116. Business rules 136 may, for example, be established by the operator of server 102 and/or participants in system 100. In a particular embodiment, business rules 136 may include a set of generic business rules 136a and a set of customized business rules 136b. Among other uses, generic rules 136a could define a standard technique for generating an anonymous profile 116 using a participant profile 114. As particular examples, a generic rule 136a could identify a subset of the fields in a participant profile 114 that could be copied to an anonymous profile 116, such as when a participant subscribes to an anonymous transaction service. Another generic rule 136a could describe how information in one or more fields in the participant profile 114 could be modified in anonymous profile 116. For example, a generic rule 136a could specify that all payment information associated with a participant should be omitted from the participant's anonymous profile 116, except for an indication of how soon payment should be made if the participant enters into a transaction.

Customized rules 136b may define participant-specified preferences used by server 102 in performing certain tasks in system 100. For example, a business rule 136b could specify that a particular participant wants to include more or less information in the participant's anonymous profile 116 than specified by the generic rules 136a. Other business rules 136b could specify that a first participant wants to make varying amounts of information available to other participants. For example, a business rule 136b could specify that the first participant wants to disclose more information to participants affiliated with different industries than the industry of the first participant. As another example, during a normal transaction, a buying participant could learn where a selling participant stores the product being purchased by the buying participant. A business rule 136b associated with the selling participant could specify that, during an anonymous transaction, server 102 should inform the buying participant of the distance between the buying participant and the location where the selling participant stores the product. As yet another example, in one embodiment, participants in system 100 may be divided into tiers or groups. The groupings could be based on the number of previous transactions, the types of previous transactions, reviews by previous customers or the operator of server 102, and any other and/or additional criteria. In this embodiment, a business rule 136b could specify that the first participant wants to disclose more information to participants in particular tiers or groupings than to participants in other tiers or groupings.

Other business rules 136 and types of rules 136 may be used without departing from the scope of this disclosure. For example, in one embodiment, the operator of server 102 may be responsible for paying a seller on behalf of a buyer during a transaction, and the operator may then receive reimbursement from the buyer at a later time. In this embodiment, a business rule 136 could specify that transactions over a certain dollar amount need to be approved by the operator before the seller can be paid. Business rules 136 may be stored in any suitable location or locations in system 100. While FIG. 1 illustrates business rules 136 residing in a database 138 coupled to server 102, business rules 136 may reside in any location or locations accessible by server 102.

Server 102 may include additional functionality without departing from the scope of this disclosure. In one embodiment, server 102 may include one or more interfaces 140. Interface 140 may allow server 102 to interact with external systems. For example, an interface 140 could allow server 102 to interact with external shipping or ordering systems so that server 102 may submit orders to clients 112 and/or verify that a shipment has been picked up and delivered. As another example, system 100 may interact with external public and/or private registries. This may occur when a participant in system 100 requests that server 102 locate possible trading partners, and server 102 locates the partners through a public registry such as a public anonymous registry. Interface 140 may include any hardware, software, firmware, or combination thereof operable to facilitate communication between server 102 and another component. In one embodiment, interface 140 includes one or more application program interfaces (APIs). In a particular embodiment, interface 140 may include a Java registry API that allows server 102 to communicate with public UDDI registries and private ebXML registries.

Server 102 could also include one or more synchronization modules 142. Synchronization module 142 allows server 102 to synchronize information between registry 104 and anonymous registry 106 and/or between participant profiles 114 and anonymous profiles 116. For example, information about a participant may change, such as the address of the participant or the communications protocols supported by the participant. This may lead to changes to one or more of the fields in the participant's profile 114. If the participant has a corresponding anonymous profile 116, none, some, or all of the changes may need to be replicated to the anonymous profile 116. Synchronization module 142 may monitor changes to the information in a participant profile 114, determine whether any of the changes need to be made in anonymous profile 116, and implement any needed changes in anonymous profile 116. In one embodiment, synchronization module 142 may use one or more business rules 136 to determine which changes to participant profile 114 should be replicated in anonymous profile 116. Synchronization module 142 may include any hardware, software, firmware, or combination thereof operable to synchronize information in system 100. In one embodiment, synchronization module 142 may implement the UDDI synchronization technique.

In one aspect of operation, a participant, such as a user using client 112, may indicate a desire to be able to enter into one or more anonymous transactions. For example, the operator of server 102 or other intermediary may offer an anonymous transaction service. Server 102 may access the participant's full profile 114 and generate a corresponding anonymous profile 116. In a particular embodiment, server 102 may generate the anonymous profile 116 using one or more business rules 136. Server 102 may further store information about the new anonymous profile 116 in anonymous registry 106, such as in anonymous profile index 134.

The participant may then wish to enter into a transaction to obtain a product and/or to supply a product. In one embodiment, the participant may submit search criteria to server 102. Server 102 could also access the participant's profile 114 and extract information from profile 114 and/or locate any business rules 136 associated with the participant. Using this and/or other information, server 102 may search the marketplace information 122 associated with one or more marketplaces and attempt to locate products for the participant. If server 102 locates any products, server 102 could make some or all of the marketplace information 122 available to the participant, such as by making the name, description, and price of the products available to client 112.

If the participant chooses to enter into an anonymous transaction, server 102 is redirected to the participant's anonymous profile 116. Server 102 may then use the anonymous profile 116 to complete the transaction. For example, the anonymous participant could represent a buyer using client 112a entering into a purchasing transaction with a seller using client 112b, and the buyer may submit a purchase order to server 102. The purchase order may include information such as the product, the quantity, and the shipping preferences desired by the buyer. Using the seller's profile 114, server 102 may generate an order that can be processed by the seller's system, such as by translating the purchase order from the buyer into a format suitable for use by client 112b. Server 102 may communicate the order to the seller, such as by communicating the order to client 112b. Server 102 may then take additional steps to facilitate completion of the order. For example, the seller client 112b may be allowed to access the anonymous profile 116 associated with the buyer client 112a, thereby learning the rating of the buyer, the industry affiliation of the buyer, the delivery carrier selections chosen by the buyer, and/or other information contained in the anonymous profile 116. Server 102 may also arrange for the product to be shipped from the seller to an intermediary, such as the entity operating server 102. The intermediary may then receive and forward the product to the buyer. Server 102 may further pay the seller, such as using funds from the intermediary, and then charge the buyer for the payment. In addition, server 102 may store information about the transaction as historical information 124 in repository 108, which may be useful for tax purposes. Because server 102 can link the anonymous profile 116 of the anonymous participant to the participant profile 114, server 102 may help to support the anonymous transactions by making sure that payment is made, tax records are updated, and/or ensuring that any other suitable activities are performed.

Although FIG. 1 illustrates one example of a system 100 for supporting anonymous transactions, various changes may be made to system 100 without departing from the scope of this disclosure. For example, the division of information in system 100 is for illustration only. Some or all of the information contained in registry 104, anonymous registry 106, repository 108, and database 138 could be combined and/or further dividing according to particular needs. Also, while FIG. 1 illustrates a server 102 performing particular tasks, any suitable computing and/or communicating device could be used. Further, the functional divisions of server 102 are for illustration only. Various components of server 102 could be combined, added, or deleted according to particular needs. In addition, while FIG. 1 illustrates one example operational environment, other environments may be used without departing from the scope of this disclosure.

FIGS. 2A and 2B are block diagrams illustrating example user profiles in a system for supporting anonymous transactions. In particular, FIG. 2A illustrates at least a portion of example participant profiles 214, and FIG. 2B illustrates at least a portion of example anonymous profiles 216. Profiles 214, 216 could, for example, be used as profiles 114, 116, respectively, in system 100 of FIG. 1. Profiles 214, 216 and the information contained in profiles 214, 216 are for illustration only. Any other suitable profiles and/or profile information may be used in system 100 without departing from the scope of this disclosure.

In FIG. 2A, participant profiles 214 include information associated with various participants in system 100. In the illustrated embodiment, each participant profile 214 includes a user identifier 252, a participant name 254, a participant address 256, an industry affiliation 258, a participant location 260, payment information 262, delivery options 264, request formats 266, and communications protocols 268. Other embodiments of participant profile 214 may be used without departing from the scope of this disclosure.

User identifiers 252 represent codes used to identify the various participants in system 100. In one embodiment, user identifiers 252 uniquely identify each participant in system 100. User identifiers 252 may include numbers, alphanumeric strings, and/or any other suitable identifiers. Server 102 may assign user identifiers 252 to participants in system 100 statically, dynamically, or in any other suitable manner.

Names 254 represent the names of participants in system 100. Addresses 256 could represent the mailing, physical, and/or other address or addresses of participants in system 100. Industry affiliations 258 identify one or more industries in which a participant in system 100 may be involved. Industry affiliations 258 could be as narrow or as broad as desired. Locations 260 identify one or more locations in which a participant in system 100 may be located, such as the locations of warehouses and factories associated with a participant.

Payment information 262 represents information that may be used by server 102 in confirming and/or making payment during a transaction. For example, payment information 262 may include credit card information that can be used by server 102 when a participant purchases a product in a transaction. Payment information 262 could also identify the methods of payment accepted by a participant selling a product. Payment information 262 could further identify when a participant agrees to make payment during a transaction, such as when an order has been accepted. Payment information 262 may include any other and/or additional information without departing from the scope of this disclosure.

Delivery options 264 identify how a participant in system 100 wishes to ship and/or receive a product. For example, delivery options 264 could identify one or more carriers and/or the types of services to be used. As particular examples, delivery options 264 could indicate that a participant wishes to receive shipments using Federal Express overnight service with insurance and automatic shipment notification. Delivery options 264 could include any other and/or additional shipment options without departing from the scope of this disclosure.

Request formats 266 identify one or more formats of requests that can be generated and/or received by the client 112 associated with a participant. For example, a buyer client 112a may be able to generate purchase requests having one particular format. Similarly, a seller client 112b may only be able to receive and process purchase requests in one particular format. The format used by buyer client 112a may not match the format used by seller client 112b. In this example, the request from buyer client 112a may need to be converted into the appropriate format by server 102, one or more of the clients 112, or another component in system 100. In this embodiment, request formats 266 identify one or more formats that can be understood by participants in system 100, such as by identifying the order of the fields used in the requests.

Communications protocols 268 identify one or more protocols that can be used by a participant in system 100 to communicate over network 110. For example, a buyer client 112a may be willing to communicate using either TCP/IP or UDP/IP, while a seller client 112b may only be willing to communicate using TCP/IP. If the clients 112 cannot communicate using a common protocol 268, communications between buyer client 112a and seller client 112b may need to be converted into the appropriate protocol or protocols by server 102, one or more of the clients 112, or another component in system 100.

In FIG. 2B, each anonymous profile 216 includes a user identifier 252, an industry affiliation 258, delivery options 264, request formats 266, communications protocols 268, and links 272 to a participant profile 214. Other embodiments of anonymous profile 216 may be used without departing from the scope of this disclosure.

In the illustrated example, each anonymous profile 216 contains at least a subset of the information from a participant profile 214. In this embodiment, information that could specifically identify a participant or a unique characteristic of the participant may be omitted from anonymous profiles 216. For example, anonymous profile 216 may not include the name 254 of the participant, the address 256 of the participant, or the payment information 262 associated with the participant, since this could be used to identify the participant. In addition, some of the request formats 266 and/or communications protocols 268 associated with a participant could be omitted from anonymous profiles 216. In the illustrated example, the communications protocol 268 "P4" has been omitted from the first anonymous profile 216. The "P4" communications protocol 268 could represent a protocol used only by one or a few participants in system 100, so that communications protocol 268 may be omitted from anonymous profile 216 to protect the identity of that participant.

In one embodiment, server 102 may generate anonymous profiles 216 using one or more business rules 136. In a particular embodiment, each participant may identify the information to be included in the participant's anonymous profile 216. As a result, different amounts and/or types of information could be included in different anonymous profiles 216 without departing from the scope of this disclosure.

Link 272 in an anonymous profile 216 represents a pointer to the participant profile 214 associated with that anonymous profile 216. For example, link 272 may identify the location of a participant profile 214 in repository 108 or the metadata associated with the participant profile 228 in registry 104. In one embodiment, when a client 112 is engaging in an anonymous transaction, the activities of that client 112 are associated with an anonymous profile 216. Server 102 may use link 272 to access the participant profile 214 associated with the anonymous profile 216. This may occur, for example, when server 102 accesses the participant profile 214 of the user to make a payment or record tax information. The use of link 272 may allow server 102 to easily access information in a participant profile 214 that is associated with the anonymous profile 216. In another embodiment, link 272 need not be included in an anonymous profile 216.

In the illustrated embodiment, not all participants have an associated anonymous profile 216. For example, the participant named "MNO" lacks an anonymous profile 216. In a particular embodiment, not all users may be able to perform anonymous transactions, such as where the operator of server 102 charges a fee for allowing anonymous transactions. In another embodiment, all users could be allowed to perform anonymous transactions, and each user could have an anonymous profile 216.

Although FIGS. 2A and 2B illustrate example profiles 214, 216 in system 100, various changes may be made to profiles 214, 216 without departing from the scope of this disclosure. For example, any other and/or additional information may be included in profiles 214, 216. Also, anonymous profiles 216 need not include links 272, and participant profiles 214 could include a similar link that identifies the associated anonymous profile 216. Further, the information contained in profiles 214, 216 could be divided and stored in multiple locations. As a particular example, some of the information in profiles 214 could be stored in registry 104 and the remaining information stored in repository 108. In addition, although FIGS. 2A and 2B illustrate profiles 214, 216 that could be used to support business-to-business transactions, system 100 could also support other types of transactions, such as business-to-consumer and consumer-to-consumer transactions.

FIG. 3 is a flow diagram illustrating an example method 300 for generating an anonymous profile in a system for supporting anonymous transactions. Method 300 may be described with respect to system 100 of FIG. 1 using the participant profiles 214 of FIG. 2A to generate anonymous profiles 216 of FIG. 2B. Method 300 could also be used in any suitable system to generate any suitable anonymous profile without departing from the scope of this disclosure.

Server 102 receives a user's request to subscribe to an anonymous service at step 302. This may include, for example, server 102 receiving the request over network 110 from a client 112 associated with the user. Server 102 identifies the participant profile 214 that is associated with the user at step 304. This may include, for example, server 102 receiving login information from the user and using the information to verify the identity of the user. This may also include server 102 accessing registry 104 and/or repository 108 and comparing the user identifier 252, the name 254, or other suitable information in the profiles 214 to the information provided by and/or associated with the user. This may further include server 102 identifying the appropriate participant profile 214, if any.

Server 102 generates an anonymous profile 216 at step 306. This may include, for example, server 102 generating an empty anonymous profile 216 in repository 108 and storing appropriate metadata in anonymous profile index 134 of anonymous registry 106. Server 102 inserts non-identifying information associated with the user into the new anonymous profile 216 at step 308. This may include, for example, server 102 inserting at least a subset of the information contained in the user's participant profile 214 into the appropriate fields of the anonymous profile 216. This may also include server 102 using one or more business rules 136 to identify the fields to be copied from participant profile 214 into anonymous profile 216. This may further include server 102 using one or more business rules 136 to determine how information from participant profile 214 should be modified before being stored in anonymous profile 216.

Although FIG. 3 illustrates one example of a method 300 for generating an anonymous profile 216, various changes may be made to method 300 without departing from the scope of this disclosure. For example, server 102 could generate an anonymous profile 216 for a user without waiting to receive the user's request to subscribe to an anonymous transaction service. Also, server 102 could generate an empty anonymous profile 216 before identifying the user's participant profile 214.

FIG. 4 is a flow diagram illustrating an example method 400 for supporting an anonymous transaction. Method 400 may be described with respect to system 100 of FIG. 1 using profiles 214, 216 of FIGS. 2A and 2B. Method 400 could also be used by any suitable system that processes any suitable profiles without departing from the scope of this disclosure.

A user in system 100 logs in with server 102 at step 402. This may include, for example, server 102 receiving a user name and a password from a client 112 over network 110. This may also include server 102 verifying the user is authorized to access server 102. This may further include server 102 locating and accessing the user's participant profile 214 in registry 104 and/or repository 108.

Server 102 receives one or more search criteria from the user at step 404. This may include, for example, the user identifying one or more characteristics of a product that the user wishes to obtain. This may also include client 112 communicating the information to server 102 over network 110. Server 102 searches for one or more products matching the user's specified search criteria at step 406. This may include, for example, server 102 searching marketplace information 122 associated with one or more marketplaces to locate matching products. In one embodiment, server 102 could search only for products that exactly match the user's criteria. In another embodiment, server 102 could search for products that partially match the user's criteria. In a particular embodiment, server 102 may use the search mechanism described in co-pending U.S. application Ser. No. 10/133,920 entitled "System and Method for Creating Electronic Marketplaces."

Server 102 displays any matching products to the user at step 408. This may include, for example, server 102 communicating the identity of the matching products, descriptions of the matching products, and prices of the matching products to client 112. Server 102 receives the user's selection of one or more of the matching products at step 410. This may include, for example, the user selecting one or more of the matching products at client 112 and client 112 communicating the identity of the selected products to server 102 over network 110.

Server 102 receives the user's request to enter into an anonymous transaction at step 412. This may include, for example, the user selecting a button on a web browser at client 112 and client 112 communicating the selection to server 102. Server 102 is redirected to the user's anonymous profile 216 at step 414. This may include, for example, server 102 locating an anonymous profile 216 that has the same user identifier 252 as the user's participant profile 214. This may also include server 102 using anonymous profile index 134 in anonymous registry 106 to locate the anonymous profile 216.

Server 102 sends an order to another participant at step 416. This may include, for example, the anonymous user deciding to enter into a transaction to obtain a product. This may also include server 102 converting the anonymous user's order from one format to another format and/or from one protocol to another protocol. This may further include server 102 communicating the order to a seller client 112 associated with a seller supplying the product.

Server 102 and/or an intermediary helps to complete the transaction at step 418. The intermediary could, for example, include the operator of server 102 or an entity associated with the operator of server 102. This may include server 102 instructing the seller client 112 to ship the ordered product to the intermediary, so the intermediary can receive and ship the product to the buying user. This may also include server 102 paying for the product using the intermediary's account and then billing or charging the buying user for that amount. Server 102 records information about the transaction as historical information 124 at step 420. This may include, for example, server 102 storing information such as the product involved and the purchase price in repository 108.

During the transaction, the seller may be able to access information in the buyer's anonymous profile 216. For example, the seller may wish to determine what type of rating the buyer has, and the seller could then decide whether to do business with the anonymous buyer. The seller may be unable to access the identifying information in the anonymous buyer's profile 214. This may help to ensure that the identity of the anonymous buyer remains hidden from the seller.

Although FIG. 4 illustrates one example of a method 400 for supporting an anonymous transaction, various changes may be made to method 400 without departing from the scope of this disclosure. For example, while FIG. 4 illustrates a buying user locating products by submitting search criteria to server 102, the user could locate products in any other suitable manner. As a particular example, the user could search through an index or in categories of products in a catalog supported by server 102, one or more selling clients 112, and/or other suitable entities. Also, method 400 is illustrated as allowing the buyer to select from a list of participants matching the buyer's search criteria. In another embodiment, server 102 could automatically select one of the identified participants, such as by using a business rule 136 stating that server 102 should select the best match. Further, the buying user could inform server 102 of the desire to enter into an anonymous transaction in another suitable manner, such as by indicating in a business rule 136 that all transactions involving the user should be anonymous or that particular types of transactions should be anonymous. In addition, method 400 has been described as involving a user purchasing a product in an anonymous transaction. The user could also act as a seller in an anonymous transaction. In that case, server 102 could inform a buying client 112 that the seller has a product matching the buying client's search parameters without identifying the seller. Server 102 could also use the seller's anonymous profile 106 to complete and log the transaction.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A system for supporting anonymous transactions in a network of clients, comprising:
   a profile memory operable to store a non-anonymous profile associated with a first client, the non-anonymous profile including identifying client data and non-identifying client data associated with the first client;
   a rules memory operable to store a business rule for identifying a first portion of the non-anonymous profile as having the identifying client data and a second portion of the non-anonymous profile as having the non-identifying client data, wherein the identifying client data includes data that is unique to a particular client and wherein the non-identifying data includes data that is not unique to any particular client;
   a processor communicatively coupled to the rules memory, the profile memory, a database interface, and an instruction memory, the instruction memory including instructions, executable by the processor, to:
      generate an anonymous profile associated with the first client based on the business rule such that the anonymous profile includes at least a portion of the non-identifying client data in the non-anonymous profile but none of the identifying client data in the non-anonymous profile;
      monitor changes to the non-anonymous profile;
      determine whether any of the changes necessitate changes to the anonymous profile;
      make any needed changes in the anonymous profile to maintain the anonymous profile in synchronization with the non-anonymous profile;
      facilitate completion of a transaction involving the first client using both the anonymous profile and the non-anonymous profile;
      receive a request from the first client to engage in an anonymous transaction with a second client for a product, and provide the second client at least partial access to the anonymous profile but not to the non-anonymous profile associated with the first client; and
      identify, based on the anonymous profile, an order format and a communications protocol supported by the first client, and convert a first order for a product from the second client to a second order having the order format and the communications protocol;
   the database interface operable to receive the first order from the second client and access the anonymous profile associated with the first client; and
   a network interface operable to communicate the second order to the first client.

2. A system according to claim 1, wherein, according to the business rule, identifying client data includes particular data that may be used for identifying a particular client based at least in part on the number of clients associated with such data being below a threshold.

3. A system according to claim 1, wherein, according to the business rule a first communications protocol is identified as non-identifying client data and a second communications protocol is identified as identifying client data.

4. A system according to claim 1, wherein, according to the business rule a first transaction request format is identified as non-identifying client data and a second transaction request format is identified as identifying client data.

5. A system according to claim 1, wherein, according to the business rule a first delivery option is identified as non-identifying client data and a second delivery option is identified as identifying client data.

6. A system according to claim 1, wherein the instruction memory includes instructions executable by the processor to receive a request from a second client to engage in an anonymous transaction with the first client for a product, and provide the second client at least partial access to the anonymous profile but not to the non-anonymous profile associated with the first client.

7. A system according to claim 1, wherein:
   the non-anonymous profile associated with the first client includes a value for a non-anonymous parameter selected from a unique identifier, a name of the first client, an address of the first client, an industry affiliated with the first client, a payment option associated with the first client, a delivery option associated with the first client, a format for requests supported by the first client, and a communications protocol supported by the first client; and
   the anonymous profile associated with the first client includes a value for an anonymous parameter selected from the unique identifier, the industry affiliated with the first client, the delivery option associated with the first client, the request format supported by the first client, the communications protocol supported by the first client, and a link associated with the first profile.

8. A system according to claim 1, wherein the business rule is defined by the first client.

* * * * *